US010469722B2

(12) United States Patent
Trail (10) Patent No.: US 10,469,722 B2
(45) Date of Patent: Nov. 5, 2019

(54) SPATIALLY TILED STRUCTURED LIGHT PROJECTOR (71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 428 days.

(21) Appl. No.: 15/249,938

(22) Filed: Aug. 29, 2016

(65) Prior Publication Data
US 2018/0063390 A1    Mar. 1, 2018

(51) Int. Cl.
H04N 5/225 (2006.01)
G06F 3/01 (2006.01)
H04N 5/222 (2006.01)
H04N 5/235 (2006.01)
G01S 17/89 (2006.01)
G02B 27/01 (2006.01)
G06K 9/00 (2006.01)
G06K 9/20 (2006.01)
G06T 7/50 (2017.01)

(52) U.S. Cl.
CPC .......... H04N 5/2256 (2013.01); G01S 17/89 (2013.01); G02B 27/0172 (2013.01); G06F 3/011 (2013.01); G06K 9/00335 (2013.01); G06K 9/00671 (2013.01); G06K 9/209 (2013.01); G06K 9/2036 (2013.01); G06T 7/50 (2017.01); H04N 5/2226 (2013.01); H04N 5/2354 (2013.01); G02B 2027/014 (2013.01); G02B 2027/0134 (2013.01); G02B 2027/0138 (2013.01); G06T 2207/10028 (2013.01); G06T 2207/10152 (2013.01)

(58) Field of Classification Search
CPC ...... H04N 5/2256; G06K 9/209; G06F 3/011; G02B 27/42
See application file for complete search history.

(56) References Cited

U.S. PATENT DOCUMENTS 7,763,841 B1 *  7/2010  McEldowney ....  B29D 11/0073
                                                            250/216
2016/0197452 A1 *  7/2016  Mor ....................  G01B 11/2513
                                                            359/569

OTHER PUBLICATIONS

Princeton Optronics, Inc., "Princeton Optronics VCSEL Technology," Nov. 2012, twenty five pages. [Online] [Retrieved Nov. 11, 2012] Retrieved from the Internet <URL:http://www.princetonoptronics.com/technology/technology.php>.
U.S. Appl. No. 15/232,073, filed Aug. 9, 2016, Inventors Nicholas Daniel Trail et al.

* cited by examiner

Primary Examiner — Dave Czekaj
Assistant Examiner — Berteau Joisil
(74) Attorney, Agent, or Firm — Fenwick & West LLP (57) ABSTRACT An illumination source in a depth camera assembly (DCA) includes multiple emitters on a single substrate and a diffractive optical element (DOE) assembly including multiple DOEs. Each DOE is configured to generate a structured light pattern from the light emitted from a corresponding emitter. The DOE assembly projects the structured light patterns onto portions of a local area based in part on DOE projection geometries associated with the DOEs. The illumination source may also include a second DOE assembly common to the multiple emitters.

21 Claims, 6 Drawing Sheets

SPATIALLY TILED STRUCTURED LIGHT PROJECTOR

BACKGROUND

The present disclosure generally relates to virtual or augmented reality systems, and more specifically relates to depth camera assemblies that obtain depth information of a local area using various patterns of structured light.

Virtual and augmented reality (AR) systems can leverage the capture of the environment surrounding a user in three dimensions (3D). However, traditional depth camera imaging architectures are comparably large in size, heavy, and consume significant amounts of power. Example common depth camera imaging architectures for obtaining 3D information of a scene include: time-of-flight (both direct-detect pulses and encoded waveforms), structured light (SL), and stereo vision. Different depth camera imaging architectures provide different strengths and weaknesses, so certain depth camera imaging architectures may provide better performance than others in different operating conditions. However, because of the relatively large size of conventional depth camera imaging architectures, many systems including a depth camera typically use a single type of depth camera imaging architecture configured for a particular use case. In addition, most of the depth camera imaging architectures are fixed and cannot adapt to sensing needs of the environment or data products being captured, either due to limitations in the architecture or design decisions around size, weight, power and stability. As head-mounted systems are increasingly used to perform a broader range of functions in varied operating conditions and environments, including large range of depths, selecting a single or fixed functionality depth camera imaging architecture to obtain depth information of an area surrounding the head-mounted system and user may impair the user experience with head-mounted systems.

SUMMARY

A depth camera assembly (DCA) that may be part of a head-mounted display (HMD) includes an illumination source, an imaging device, and a controller. The illumination source includes a plurality of emitters on a single substrate, each emitter configured to emit light, and a diffractive optical element (DOE) assembly including a plurality of diffractive optical elements (DOE), wherein each DOE is configured to generate a structured light (SL) pattern from light emitted from a corresponding emitter of the plurality of emitters, wherein the DOE assembly projects the SL patterns onto portions of a local area based in part on DOE projection geometries associated with the DOEs. An imaging device is configured to capture one or more images of the local area illuminated with light from the illumination source, and a controller is configured to instruct at least one of the plurality of emitters to emit light based in part on depth information associated with one or more objects in the local area.

In one embodiment, the SL light pattern may include at least two different pattern types. The DOE projection geometry of one SL pattern may cover an area not covered by another SL pattern. The DOE projection geometry of one SL pattern may cover an area that is larger than an area covered by the DOE projection geometry of another SL pattern. The SL pattern projected onto a smaller area or portion of the local area may have comparably higher maximum irradiance value than the other SL pattern. The DCA can control what SL pattern is projected onto the local area to optimize for parameters such as coverage of the area, signal-to-noise ratio, and resolution. In the embodiments described above, it is possible to control the SL pattern to produce a wider angle system with reduced maximum irradiance or resolution to determine depth information on closer objects (i.e., hands), over mapping the far corners of a room where the quality of the signal becomes more important (i.e., requires higher irradiance SL pattern to pull out lower reflectivity signals).

In some embodiments, the DCA may be part of a head-mounted display (HMD) for use in a virtual reality (VR), mixed reality (MR), augmented reality (AR), or some combination thereof, system environment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
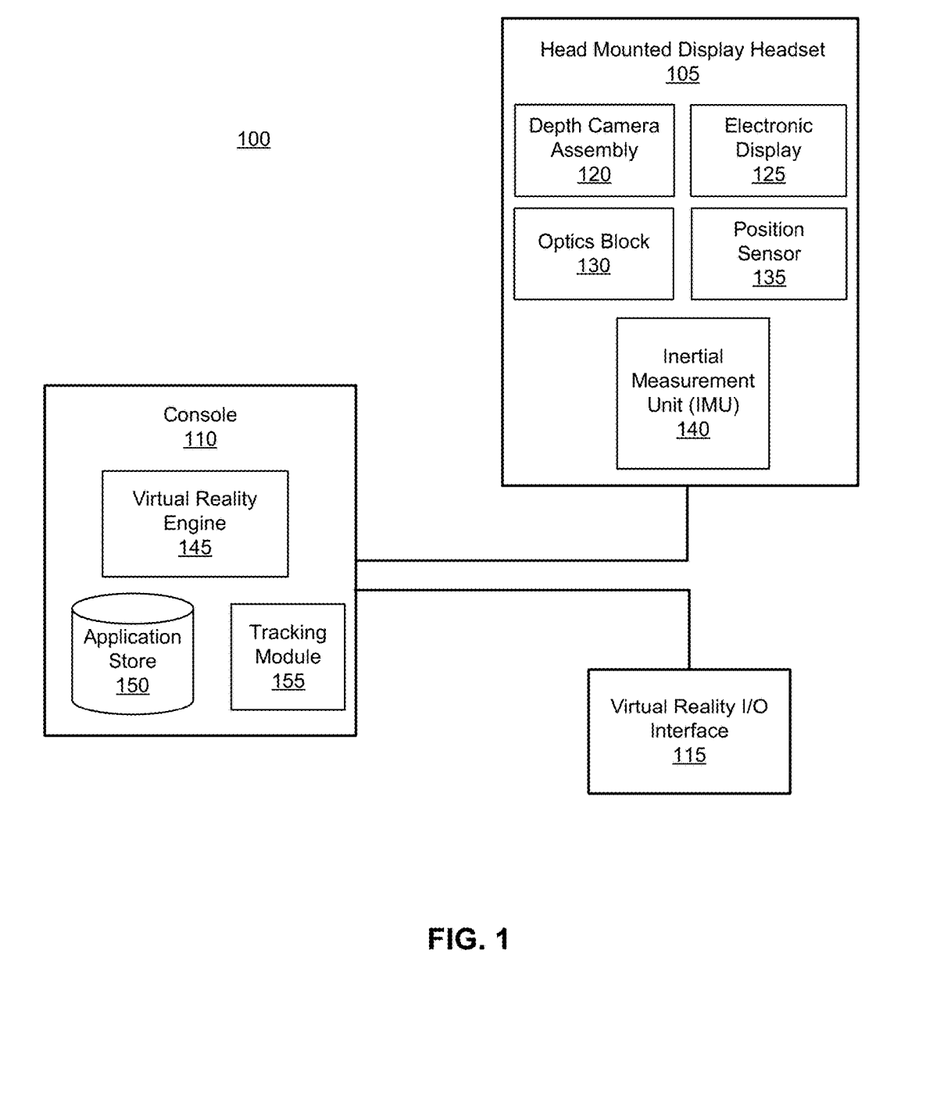
FIG. 1 is a block diagram of a system environment including a multi-pattern depth camera assembly, in accordance with an embodiment.

FIG. 1 is a block diagram of a system 100 including a multi-pattern depth camera assembly 120, according to an embodiment. The system 100 may operate in a VR environment, AR environment, a MR environment, or some combination thereof. The system 100 shown by FIG. 1 comprises a HMD 105 and a VR input/output (I/O) interface 115 that is coupled to a console 110. While FIG. 1 shows an example system 100 including one HMD 105 and one VR I/O interface 115, in other embodiments any number of these components may be included in the system 100. For example, there may be multiple HMDs 105 each having an associated VR I/O interface 115, with each HMD 105 and VR I/O interface 115 communicating with the console 110. In alternative configurations, different and/or additional components may be included in the system 100. Additionally, functionality described in conjunction with one or more of the components shown in FIG. 1 may be distributed among the components in a different manner than described in conjunction with FIG. 1 in some embodiments. For example, some or all of the functionality of the console 110 is provided by the HMD 105.

The HMD 105 is a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the HMD 105, the console 110, or both, and presents audio data based on the audio information. The HMD 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 105 may also act as a VR headset that presents virtual content to the user that is based in part on a real environment surrounding the user and/or a MR headset. For example, virtual content may be presented to a user of the HMD. The user physically may be in a room, and virtual walls and a virtual floor of the room are rendered as part of the virtual content.

The HMD 105 includes a multi-pattern depth camera assembly also referred to as a depth camera assembly (DCA) 120, an electronic display 125, an optics block 130, one or more position sensors 135, and an inertial measurement Unit (IMU) 140. Some embodiments of The HMD 105 have different components than those described in conjunction with FIG. 1. Additionally, the functionality provided by various components described in conjunction with FIG. 1 may be differently distributed among the components of the HMD 105 in other embodiments, or be captured in separate assemblies remote from the HMD 105.

The DCA 120 determines depth information for a local area based on one or more SL patterns. The DCA 120 projects structured light (SL) into a local area. As discussed in detail below, the DCA 120 includes an illumination source, an imaging device, and a controller. The illumination source includes a plurality of emitters on a single—common substrate, a one or more DOEs in a DOE assembly. The DOE assembly may be a single DOE substrate with a plurality of DOEs or a fixture that holds and positions plurality of DOEs, and may include one or more optical windows. The emitter illuminates one or more DOEs, which generates one or more SL patterns that are projected into the local area. In some embodiments, each DOE has a corresponding emitter to produce a corresponding SL pattern on a corresponding portion of the local area. The corresponding SL pattern may be a different SL pattern or the same SL pattern. Additionally, in some embodiments, a common DOE is placed between the plurality of emitters and the plurality of DOEs. Pattern offsets may be useful in depth information determination, such as improving resolution, accuracy, and precision limits. The DCA 120 captures images of SL from the illumination source that is reflected from objects in a portion of the area surrounding the DCA 120. The DCA 120 determines the depth information of objects in a portion of the area surrounding the DCA 120 using a SL technique. Depth information may be determined from the captured images by, e.g., the DCA 120. In alternate embodiments, the images are provided to the console 110 which determines depth information. The DCA 120 is discussed in detail below with regard to FIGS. 3-6.

The electronic display 125 displays 2D or 3D images to the user in accordance with data received from the console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an inorganic light emitting diode (ILED), an active-matrix organic light-emitting diode display (AMOLED), some other display, or some combination thereof. In some embodiments, the display is at least partially transparent, and may be, e.g., a transparent OLED display.

The optics block 130 magnifies image light received from the electronic display 125, corrects optical errors associated with the image light, and presents the corrected image light to a user of the HMD 105. In various embodiments, the optics block 130 includes one or more optical elements. Example optical elements included in the optics block 130 include: an aperture, a Fresnel lens, a convex lens, a concave lens, a filter, a reflecting surface, or any other suitable optical element that affects image light. Moreover, the optics block 130 may include combinations of different optical elements. In some embodiments, one or more of the optical elements in the optics block 130 may have one or more coatings, such as partially reflective or anti-reflective coatings.

Magnification and focusing of the image light by the optics block 130 allows the electronic display 125 to be physically smaller, weigh less, and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the HMD 105 based on measurement signals received from one or more of the position sensors 135 and from depth information received from the DCA 120. A position sensor 135 generates one or more measurement signals in response to motion of the HMD 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the HMD 105 relative to an initial position of the HMD 105. For example, the position sensors 135 include multiple accelerometers to measure translational motion (forward/back, up/down, left/right) and multiple gyroscopes to measure rotational motion (e.g., pitch, yaw, roll). In some embodiments, the IMU 140 rapidly samples the measurement signals and calculates the estimated current position of the HMD 105 from the sampled data. For example, the IMU 140 integrates the measurement signals received from the accelerometers over time to estimate a velocity vector and integrates the velocity vector over time to determine an estimated current position of a reference point on the HMD 105. Alternatively, the IMU 140 provides the sampled measurement signals to the console 110, which interprets the data to reduce error. The reference point is a point that may be used to describe the position of the HMD 105. The reference point may generally be defined as a point in space or a position related to the HMD's 105 orientation and position.

The IMU 140 receives one or more parameters from the console 110. As further discussed below, the one or more parameters are used to maintain tracking of the HMD 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated by the IMU 140. The accumulated error, also referred to as drift error, causes the estimated position of the reference point to "drift" away from the actual position of the reference point over time. In some embodiments of the HMD 105, the IMU 140 may be a dedicated hardware component. In other embodiments, the IMU 140 may be a software component implemented in one or more processors.

The VR I/O interface 115 is a device that allows a user to send action requests and receive responses from the console 110. An action request is a request to perform a particular action. For example, an action request may be an instruction to start or end capture of image or video data, or an instruction to perform a particular action within an application. The VR I/O interface 115 may include one or more input devices. Example input devices include: a keyboard, a mouse, a game controller, or any other suitable device for receiving action requests and communicating the action requests to the console 110. An action request received by the VR I/O interface 115 is communicated to the console 110, which performs an action corresponding to the action request. In some embodiments, the VR I/O interface 115 includes an IMU 140, as further described above, that captures calibration data indicating an estimated position of the VR I/O interface 115 relative to an initial position of the VR I/O interface 115. In some embodiments, the VR I/O interface 115 may provide haptic feedback to the user in accordance with instructions received from the console 110. For example, haptic feedback is provided when an action request is received, or the console 110 communicates instructions to the VR I/O interface 115 causing the VR I/O interface 115 to generate haptic feedback when the console 110 performs an action.

The console 110 provides content to the HMD 105 for processing in accordance with information received from one or more of: the DCA 120, the HMD 105, and the VR I/O interface 115. In the example shown in FIG. 1, the console 110 includes an application store 150, a tracking module 155 and a VR engine 145. Some embodiments of the console 110 have different modules or components than those described in conjunction with FIG. 1. Similarly, the functions further described below may be distributed among components of the console 110 in a different manner than described in conjunction with FIG. 1.

The application store 150 stores one or more applications for execution by the console 110. An application is a group of instructions, that when executed by a processor, generates content for presentation to the user. Content generated by an application may be in response to inputs received from the user via movement of the HMD 105 or the VR I/O interface 115. Examples of applications include: gaming applications, conferencing applications, video playback applications, or other suitable applications.

The tracking module 155 calibrates the system environment 100 using one or more calibration parameters and may adjust one or more calibration parameters to reduce error in determination of the position of the HMD 105 or of the VR I/O interface 115. For example, the tracking module 155 communicates a calibration parameter to the DCA 120 to adjust the operation of the DCA 120 to more accurately determine positions of SL elements captured by the DCA 120. Calibration performed by the tracking module 155 also accounts for information received from the IMU 140 in the HMD 105 and/or an IMU 140 included in the VR I/O interface 115. Additionally, if tracking of the HMD 105 is lost (e.g., the DCA 120 loses line of sight of at least a threshold number of SL elements), the tracking module 140 may re-calibrate some or all of the system environment 100.

The tracking module 155 tracks movements of the HMD 105 or of the VR I/O interface 115 using information from the DCA 120, the one or more position sensors 135, the IMU 140 or some combination thereof. For example, the tracking module 155 determines a position of a reference point of the HMD 105 in a mapping of a local area based on information from the HMD 105. The tracking module 155 may also determine positions of the reference point of the HMD 105 or a reference point of the VR I/O interface 115 using data indicating a position of the HMD 105 from the IMU 140 or using data indicating a position of the VR I/O interface 115 from an IMU 140 included in the VR I/O interface 115, respectively. Additionally, in some embodiments, the tracking module 155 may use portions of data indicating a position of the HMD 105 from the IMU 140 as well as representations of the local area from the DCA 120 to predict a future location of the HMD 105. The tracking module 155 provides the estimated or predicted future position of the HMD 105 or the VR I/O interface 115 to the VR engine 145.

The VR engine 145 generates a 3D mapping of the area surrounding the HMD 105 (i.e., the "local area") based on information received from the HMD 105. In some embodiments, the VR engine 145 determines depth information for the 3D mapping of the local area based on information received from the DCA 120 that is relevant for techniques used in computing depth. The VR engine 145 may calculate depth information using one or more techniques to compute depth based on SL. A SL technique may include, e.g., using triangulation and/or perceived deformation of a SL pattern that is projected onto a surface to determine depth and surface information of objects within the scene. A SL technique may also be used with a time of flight (ToF) technique to capture ToF information simultaneously or near-simultaneously with SL information by capturing temporal phases of the SL modulated by the carrier signal emitted by the illumination source. The data collected from the combined technique includes both SL and ToF information to determine depth information of objects in the scene. In various embodiments, the VR engine 145 uses different types of information determined by the DCA 120 or a combination of types of information determined by the DCA 120.

The VR engine 145 also executes applications within the system environment 100 and receives position information, acceleration information, velocity information, predicted future positions, or some combination thereof, of the HMD 105 from the tracking module 155. Based on the received information, the VR engine 145 determines content to provide to the HMD 105 for presentation to the user. For example, if the received information indicates that the user has looked to the left, the VR engine 145 generates content for the HMD 105 that mirrors the user's movement in a virtual environment or in an environment augmenting the local area with additional content. Additionally, the VR engine 145 performs an action within an application executing on the console 110 in response to an action request received from the VR I/O interface 115 and provides feedback to the user that the action was performed. The provided feedback may be visual or audible feedback via the HMD 105 or haptic feedback via the VR I/O interface 115.

Figure 2:
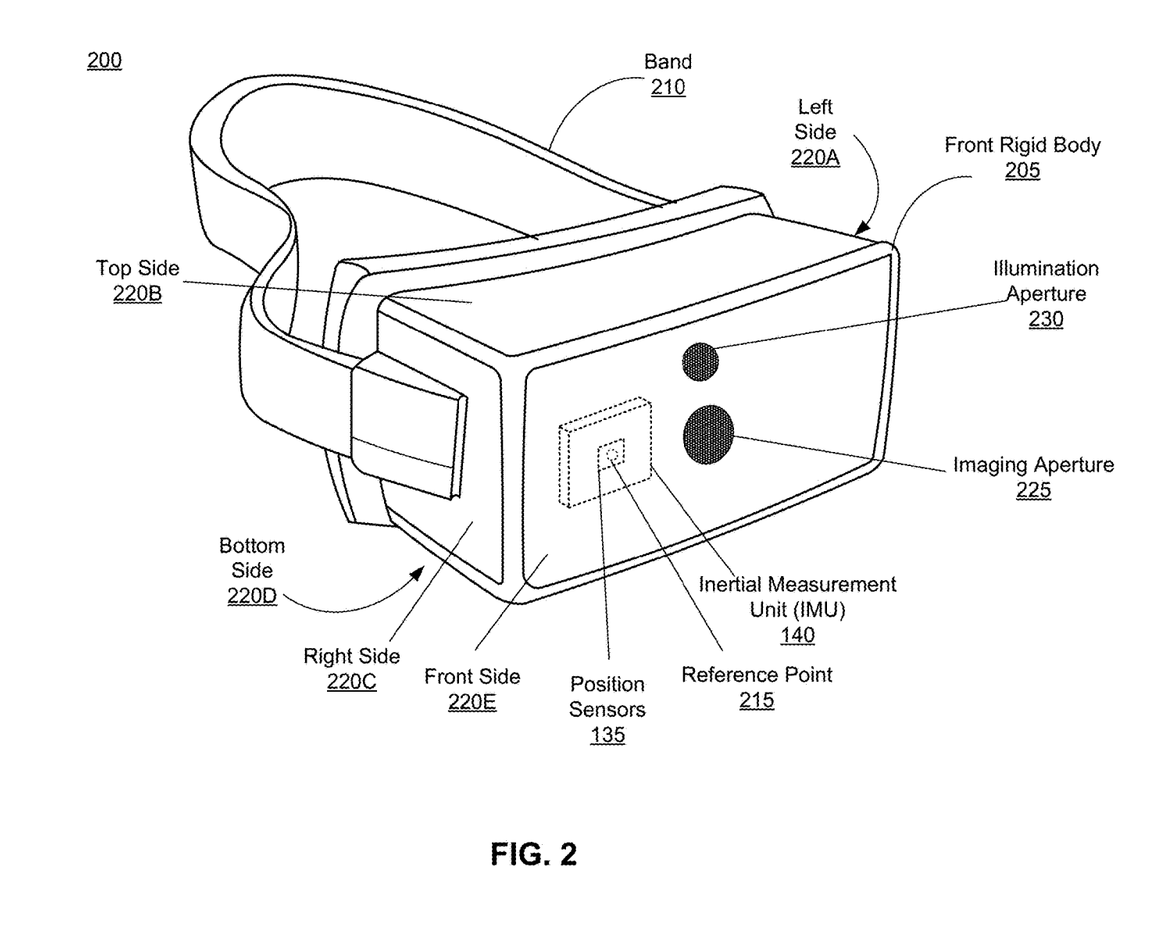
FIG. 2 is a diagram of a HMD, in accordance with an embodiment.

FIG. 2 is a wire diagram of one embodiment of a HMD 200. The HMD 200 is an embodiment of the HMD 105, and includes a front rigid body 205, a band 210, a reference point 215, a left side 220A, a top side 220B, a right side 220C, a bottom side 220D, and a front side 220E. The HMD 200 shown in FIG. 2 also includes an embodiment of a depth camera assembly (DCA) 120 and depicts an imaging aperture 225 and an illumination aperture 230. Some embodiments of the DCA 120 include an imaging device, and an illumination source. The illumination source emits light through an illumination aperture 230. The imaging device captures light from the illumination source and ambient light in the local area through an imaging aperture 225. The front rigid body 205 includes one or more electronic display elements of the electronic display 125 (not shown), the IMU 130, the one or more position sensors 135, and the reference point 215.

Although a single imaging aperture 225 and a single illumination aperture 230 are shown in the embodiment of FIG. 2, other embodiments may include multiple illumination apertures corresponding to multiple illumination sources and multiple imaging apertures corresponding to multiple imaging devices.

In some embodiments, of the front rigid body 205 may be at least partially transparent to visible light. For example, the front side 220E, the right side 220C, the left side 220A, the top side 220b, the bottom side 220D, or any combination thereof, may be at least partially transparent to visible light. Similarly, components within the HMD 200 may be at least partially transparent to visible light, such that a user is able to look through the HMD 200 into a local area surrounding the user.

Figure 3:
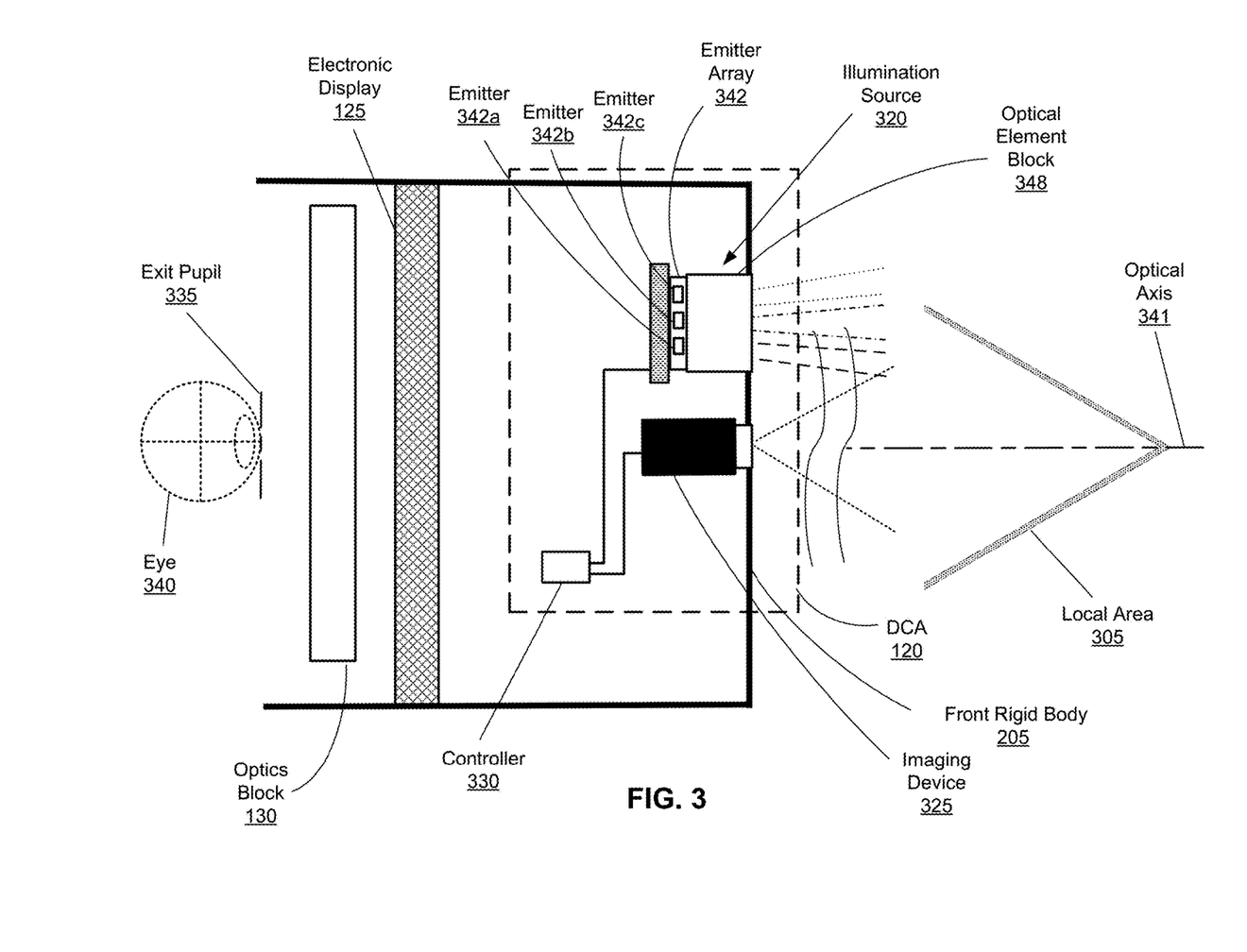
FIG. 3 is a cross section of a front rigid body of the HMD depicted in FIG. 2, in accordance with an embodiment.

FIG. 3 is a cross section 300 of the front rigid body 205 of the HMD headset 200 depicted in FIG. 2. As shown in FIG. 3, the front rigid body 205 includes a DCA 120, the electronic display 125, and the optics block 130. The front rigid body 205 has an exit pupil 335 that is set by or generally corresponds to a location of a user's eye. For purposes of illustration, FIG. 3 shows a cross section of the front rigid body 205 in accordance with a single eye 340. FIG. 3 shows a cross section 300 of the front rigid body 205 for a single eye 340 of the user, with another electronic display 125 and optics block 130, separate from those shown in FIG. 3, included in the front rigid body 205 to present content, such as an augmented representation of the local area 305 or virtual content, to another eye of the user. As described above in conjunction with FIG. 1, the electronic display 125 emits light forming an image toward the optics block 130, which alters the light received from the electronic display 125. The optics block 130 directs the altered image light to the exit pupil 335.

Additionally, although the cross section of FIG. 3 depicts the DCA 120 and the eye 340 being in the same plane for simplicity, the DCA 120 and the eye 340 may be in different planes. For example, in the embodiment shown in FIG. 2, the illumination aperture 230 and imaging aperture 225 of the DCA 120 are located at the center vertical cross section of the HMD headset 200, while the eyes of the user are positioned on the right and left side of this center vertical cross sectional plane. The local area 305 reflects incident ambient light as well as light projected by the illumination source 320.

The DCA 120 determines depth information associated with one or more objects in the local area 305. The DCA 120 includes an illumination source 320, an imaging device 325, and a controller 330. The front rigid body 205 also has an optical axis 341 corresponding to a path along which light propagates through the front rigid body 205. In some embodiments, the imaging device 325 is positioned along the optical axis and captures images of a local area 305, which is a portion of an environment surrounding the front rigid body 205 within a field of view of the imaging device 325.

The illumination source 320 illuminates a local area 305 with SL. Although FIG. 3 depicts a single illumination source 320, there may be multiple illumination sources, each illumination source may have a corresponding illumination aperture. The local area 310 is an area surrounding the HMD 105 and includes objects in a field of view of the imaging device 325. The illumination source 320 includes an emitter array 342 and an optical block element 348.

The emitter array 342 is configured to emit one or more beams of light and includes a plurality of emitters on a single substrate. A typical emitter could be a laser diode or solid-state laser made by a semiconductor fabrication process. A plurality of laser diodes could be made on a single substrate or a monolithic substrate and maintained in as-fabricated orientation (common structure carrier, inheriting semiconductor/lithographic precision) in the illumination source 320. Each emitter emits light having certain characteristics. A characteristic is a feature that describes light emitted from an emitter. A characteristic may be e.g., polarization, range of wavelengths, amplitude, temporal modulation, some other feature that describes emitted light, intensity, or some combination thereof. In some embodiments, the plurality of emitters all have the same characteristics. In other embodiments, one or more of the characteristics may be different in each emitter from other emitters in the illumination source 320. A range of wavelengths is generally some portion of a band of light. Example bands of light emitted by the emitters include: a visible band (~380 nm to 750 nm), an infrared (IR) band (~750 nm to 1500 nm), an ultraviolet band (100 nm to 380 nm), another portion of the electromagnetic spectrum, or some combination thereof. In some embodiments, the plurality of emitters in the illumination source 320 all emit light within the same range of wavelengths (e.g., near 950 nm). In alternate embodiments, different emitters in the illumination source 320 emit light within different bands. For example, one emitter may emit in in a sub-region of the IR band (for example 890 nanometers), and a different emitter may emit in another portion of the IR band (for example 940 nanometers). Similarly other characteristics may vary or be the same between emitters in the illumination source 320. In FIG. 3, the illumination source 320 includes emitter 342, emitter 344, and emitter 346. However, in other embodiments the illumination source 320 includes some other number of emitters.

The illumination source 320 includes an optical element block 348 that includes a DOE assembly (not shown) with a plurality of DOEs, each DOE is associated with a corresponding emitter. A DOE may be e.g., a Fresnel lens, a diffraction grating series of combined diffraction elements, some other DOE, or some combination thereof. In one embodiment, the DOE assembly includes a first DOE, a second DOE, and a third DOE. The emitter 342a, the emitter 342b, and the emitter 342c emit light through a first DOE, a second DOE, and a third DOE to create structured light corresponding to each DOE. Each emitter and corresponding DOE may produce a same or different SL pattern on different portions of the local area 305.

The SL pattern may include at least two different pattern types. Having two different pattern types gives the DCA different options for illuminating light onto objects in the local area. For example, there are different advantages for picking an SL pattern of lines or dense dots over an SL pattern of sparse dots. An SL pattern of lines or dense dots may give more detailed depth information over a SL pattern of sparse dots because the pattern of lines or dense dots contains more information about the distortion of a line pattern or more dots over an object in contrast to a SL pattern of fewer dots. However, an emitter producing an SL pattern of sparse dots may give better depth information for far objects because a sparse dot pattern can have higher power (signal) per dot for reaching a far object than the same emitter producing an SL line pattern or with more dots, which will have a lower power signal since the power of the emitter is distributed over a line or more dots (relative area in which the energy/irradiance is spread across).

The illumination source 320 is a spatially tiled SL projector. Each emitter and corresponding DOE generates a SL pattern that is projected on overlapping or different portions of the local area 305 based in part on DOE projection geometries associated with the DOE. The DOE projection geometry is a region in space where the DOE is projected to that does not change relative to the DCA. The different portions of the local area 305 for each SL pattern are spatially adjacent to or overlapping with each other (e.g., "tiled").

The illumination source 320 may cover different field of views. For example, a first emitter may be aimed at a first DOE to cover a smaller field of view with increased energy (scene irradiance) to pull out lower reflectivity signals (e.g., walls that are far away). A second emitter may be aimed at a second DOE to provide an increased field of view with decreased energy (lower scene irradiance) for working with high reflectivity or near objects (e.g., hands).

In one embodiment, the SL pattern includes at least two different pattern types (e.g., dense/sparse pattern of dots, lines, or grid). A first SL pattern may be different than a second SL pattern to produce two different pattern types. For example, the emitter 342a emits light through a first DOE to create a first SL pattern and the emitter 342b emits light through a second DOE to create a second SL pattern; the first SL pattern may be a pattern of dots and the second SL pattern may be a denser pattern of dots; the first and second SL pattern are of different pattern types.

In one embodiment, the DOE projection geometries are such that at least one SL pattern covers an area that is not covered by another SL pattern. A first and second SL pattern may cover areas that do not overlap, the first SL pattern may cover a larger area than the second SL pattern and contain the second SL pattern, the first SL pattern may cover an area that overlaps with the area covered by the second SL pattern and both covered areas may contain areas that are not covered by the other SL pattern. For example, a first SL pattern may cover a rectangular area, a second SL pattern may cover a narrow strip of the rectangular area covered by the first SL pattern. Additionally, the second SL pattern may cover an area not covered by the first SL pattern; the second SL pattern may cover a width that is wider than the width of the rectangular area covered by the first SL pattern of dots. In this example, the first SL pattern may be used to map the far corners of the room while the second SL pattern may be used to map a user's hands that are relatively closer to the DCA.

In one embodiment, the DOE projection geometries are such that at least one SL pattern covers a portion of the local area that is larger than a portion of the local area covered by another SL pattern. A first SL pattern may cover an area that is larger than an area covered by a second SL pattern. For example, a first SL pattern may be used to map the far corners of a room and cover a relatively larger area (although smaller field of view) than a second SL pattern used to map a user's hands.

In one embodiment, an SL pattern projected onto a smaller portion of the local area than another SL pattern has lower net irradiance value than another SL pattern. A first SL pattern may be projected onto a smaller portion of the local area and contain a denser pattern than a second SL pattern, thus having a lower irradiance value than the second SL pattern. For example, a first SL pattern may be used to map a user's hands and cover a smaller portion of the local area, the first SL pattern may be lines or dense dots which produces a lower irradiance value in comparison to a second SL pattern used to map the far corners of a room which may be a sparse dot pattern.

The optical element block 348 may also include one or more optical elements common to the plurality of emitters. The optical elements may be, e.g., a common-path diffractive optical element (DOE), a collimation lens, a mask that when illuminated creates a SL pattern, an optical window, etc. A common-path DOE is a DOE that light from all of the emitters passes through. In one embodiment, the one or more optical elements may include a common collimation lens.

In some embodiments, the optical element includes a common DOE to the plurality of emitters (e.g., emitter 342a, the emitter 342b, and the emitter 342c). The structured light produced from each emitter may be a specified pattern, such as a symmetric or quasi-random dot pattern, grid, or horizontal bars. Within a center region of the field of view (e.g., an area that where projection geometry of individual emitters overlap), the density of the specified pattern can increase as additional emitters are activated. In addition, based upon the emitter spacing, the apparent field of view for the structured light pattern can increase, as the output pattern may appear to be copied and shifted in angular coordinates after going through the common DOE. For example, in one embodiment the common DOE may create a dot pattern. When emitter 342a is activated, a first dot pattern is produced. When emitter 342b is activated, a second dot pattern is produced, similar to the first dot pattern, but shifted in both spatial origin and projected angular axis location in the corresponding local area 310. Thus, activating both emitter 342a and emitter 342b at the same time produces two dot patterns, approximately twice the density of the dot pattern (if so utilized) produced by a single emitter where the dot patterns overlap, and otherwise may increase the illumination field of view.

The imaging device 325 captures images of the local area 310. The imaging device 325 may include one or more detectors and one or more optical elements (e.g., one or more lenses, a diffractive element, a wavelength filter, a polarizer, an aperture, or some combination thereof). The imaging device 325 may capture and record particular bands of light or specific polarizations of light. For example, the imaging device 325 may capture images including light in the visible band and in the infrared band.

The controller 330 may select what SL pattern is projected onto the field of view to maximize coverage, signal to noise ratio and resolution. For instance, when tracking objects that are close (i.e., a user's hands), the controller 330 may reduce irradiance and increase field of view. In contrast, for mapping far corners of a room, field of view may be less important relative to quality in the received signal. In one embodiment, the controller 330 may select the SL pattern based on the experience being presented to the user (e.g., if the user is involved in an activity that requires 3D knowledge of the hands or objects in close proximity, versus "room reconstruction" operations). The controller 330 could also prioritize which pattern has priority based on the desired activity. As another example, the controller 330 could ensure that 8 out of every 10 frames captured are based around the near-field, hand/near-object optimized pattern, and then use the other 2 frames to ensure the medium-to-far objects (e.g., general "room" environment) have not changed.

Figure 4:
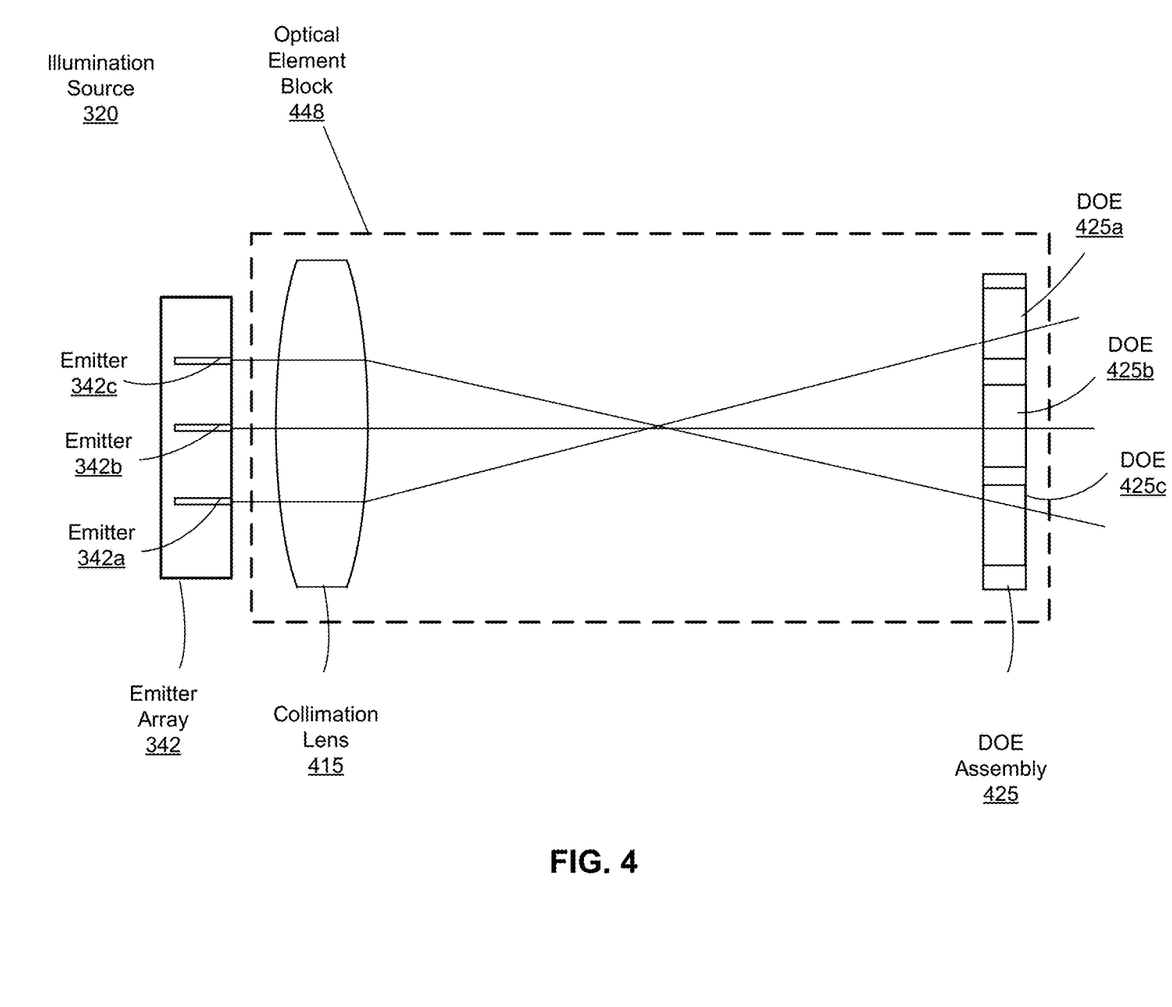
FIG. 4 is a cross section of the illumination source depicted in FIG. 3 including a first DOE assembly, in accordance with an embodiment.

FIG. 4 is a cross section of an illumination source 420 including a first DOE assembly 425, in accordance with an embodiment. In some embodiments, the illumination source 420 is an embodiment of the illumination source 320. The illumination source 420 includes an emitter array 342 and optical element block 448.

The optical element block 448 includes a collimation lens 415 and a DOE assembly 425. The collimation lens 415 is a lens or series of lens or other optical materials, such as a reflective mirror or diffractive substrate, that substantially collimates light (the light may be focused at a conjugate image plane that is not at infinity) from the emitters 342a, 342b, and 342c. Based on the activity desired, this collimation may not be near the etendue or diffraction limit. The collimation lens 415 is between the emitter array 342 and the DOE assembly 425.

The DOE assembly 425 includes one or more DOEs. In some embodiments, the DOE assembly 425 is a common substrate which the DOEs were formed on. The DOE assembly 425 includes a plurality of DOEs, specifically, a DOE 425a, a DOE 425b, and a DOE 425c. As mentioned previously, these DOEs may be fabricated within a monolithic substrate or as separate DOE substrates and aligning the separate DOEs through external means. In either embodiment, the DOEs occupy different regions of space to select which emitter 342a, emitter 342b, or emitter 342c would be incident. Each DOE may be of the same pattern type or of different pattern types and may have the same or different projection geometries. In another embodiment, the DOE assembly 425 is a common fixture which holds and registers (aligns) multiple individual DOEs.

Light generated from the emitter 342a is substantially collimated by collimation lens 415 and travels through DOE 425a to produce a SL pattern light corresponding to DOE 425a. Light generated from emitter 342b is substantially collimated by collimation lens 415 and travels through DOE 425b to produce a SL pattern light corresponding to DOE 425b. Light generated from emitter 342c is substantially collimated by collimation lens 415 and travels through DOE 425c to produce SL pattern light corresponding to DOE 425c. Specifically, by having a common collimation lens 415 for the emitter array 342, the DCA 120 is able to remove ambiguity about the stability and orientation of any individual emitter 342a, 342b, 342c. For instance, because all the emitters go through a "common" optical path, they will substantially share the same six (6) degrees of freedom relative to overall system placement and operation. This helps to remove potential variables in the alignment and calibration procedure, as well as help ensure a more stable operating system in a final product form-factor for a given size, weight, and volume budget. The reason the rays (light generated from emitter 342a, emitter 342b, and emitter 342c) 'cross' is based on the telecentric nature of the diode array. This can be controlled by the emission axes of the laser sources represented by emitter 324a, emitter 324b, and emitter 342c.

Figure 5:
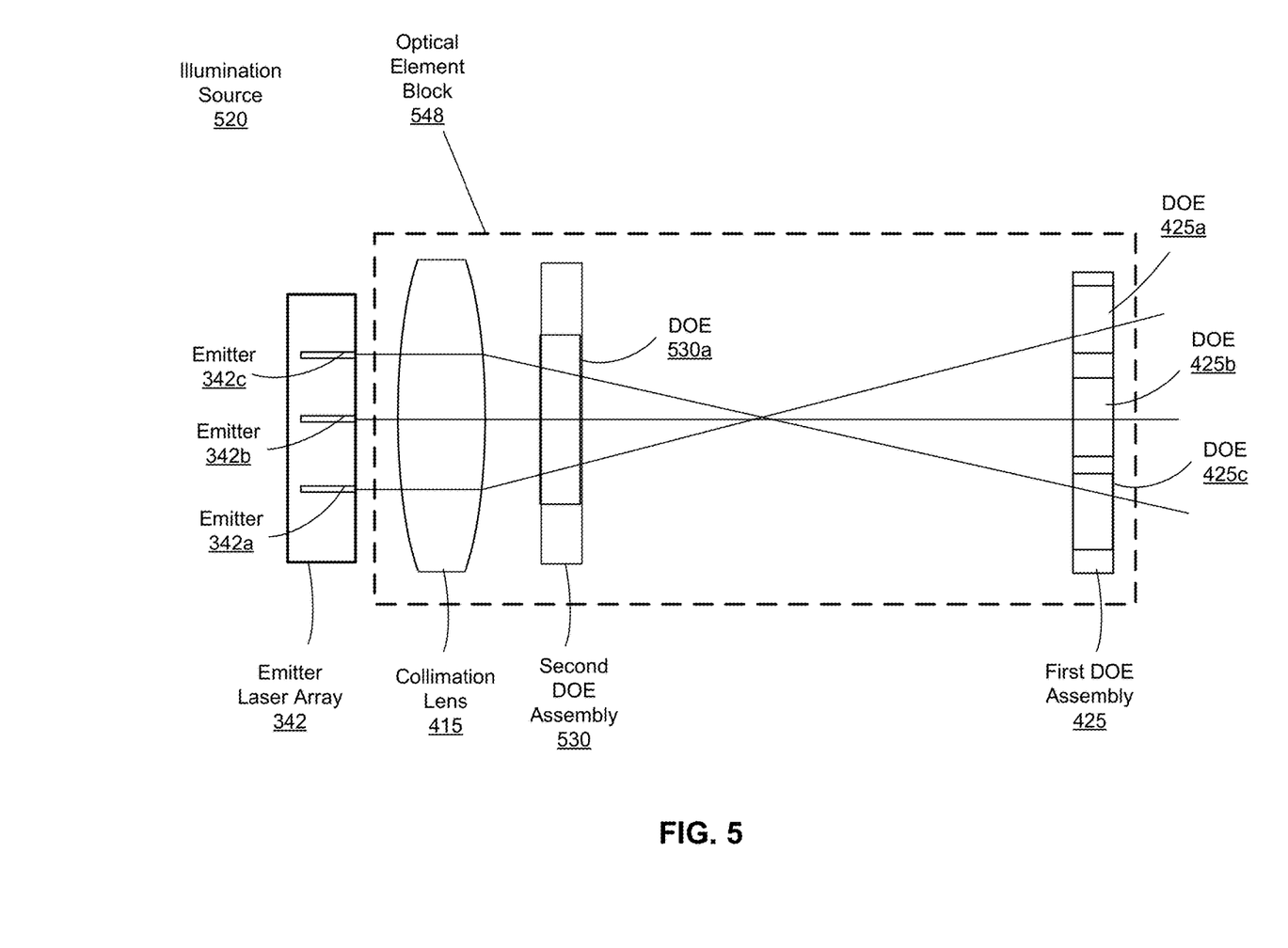
FIG. 5 is a cross section of the illumination source depicted in FIG. 3 including a first DOE assembly and a second DOE assembly, in accordance with an embodiment.

FIG. 5 is a cross section of an illumination source 520 that includes a first DOE assembly 425 and a second DOE assembly 530, in accordance with an embodiment. In this embodiment, illumination source 520 includes an emitter array 342 and optical element block 548. The optical element block 548 is similar to the optical element block 448 except that it additionally includes a second DOE assembly 530 in addition to the common collimation lens 415 and first DOE assembly 425 of optical element block 448. In one embodiment, the first DOE assembly 425 may include an optical window and be passive to the transmitting light. For example, although not shown in FIG. 5, the first DOE assembly 425 may have an optical window (e.g., opening) in the position where DOE 425a is located, allowing light from emitter 342a to pass through unmodified by the first DOA assembly 425.

The second DOE assembly 530 is a device that includes one or more DOEs. In some embodiments, the one or more DOEs are formed on a common substrate. The second DOE assembly 530 is placed between the common collimation lens 415 and the DOE assembly 425 of optical block element 548. The second DOE assembly 530 includes a DOE 530a. The DOE 530a may have a pattern and/or projection geometry that is the same or different to DOE 425a, DOE 425b, and DOE 425c.

Light generated from emitter 342a, emitter 342b and emitter 342c may be collimated by collimation lens 415 and pass through DOE 530a. Light exiting DOE 530a from emitter 342a may pass through DOE 425a and produce a SL pattern light corresponding to both DOE 425a and DOE 530a. Light exiting DOE 530a from emitter 342b may pass through DOE 425b and produce a SL pattern light corresponding to both DOE 425b and DOE 530a. Light exiting DOE 530a from emitter 342c may pass through DOE 425c and produce a SL pattern light corresponding to both DOE 425c and DOE 530a. In one embodiment, although not shown, the first DOE assembly 425 includes one or more optical windows to be passive to the transmitting light to allow the combination of having an emitter produce a light pattern characteristic of the DOE 530a in a second DOE assembly 530 and not a DOE 425a, DOE 425b, or DOE 425c of the first DOE assembly 425. For example, if DOE 425a is replaced by an optical window, light exiting the first DOE assembly 425 from emitter 342a will produce a SL pattern light corresponding to only DOE 530a. The combination of a first DOE assembly 425 and a second DOE assembly 530 may enable creation of multiple SL patterns. For example, the second DOE assembly 530 may be a pattern that creates an array of 10×10 dots within a box of angular volume. The SL array of 10×10 dots can be unmodified by an optical window or modified by different DOEs of the first DOE assembly 425 to produce a 10×10 dot pattern (e.g., unmodified by an optical window), a 10×100 dot pattern (e.g., modified by a DOE), and a 100×100 dot pattern (e.g., modified by a different DOE). Additionally, the combination of a first DOE assembly 425 and a second DOE assembly 530 may enable patterns that may not be achievable with a single DOE assembly, or facilitate the fabrication of a complex pattern by producing it with two DOEs.

Figure 6:
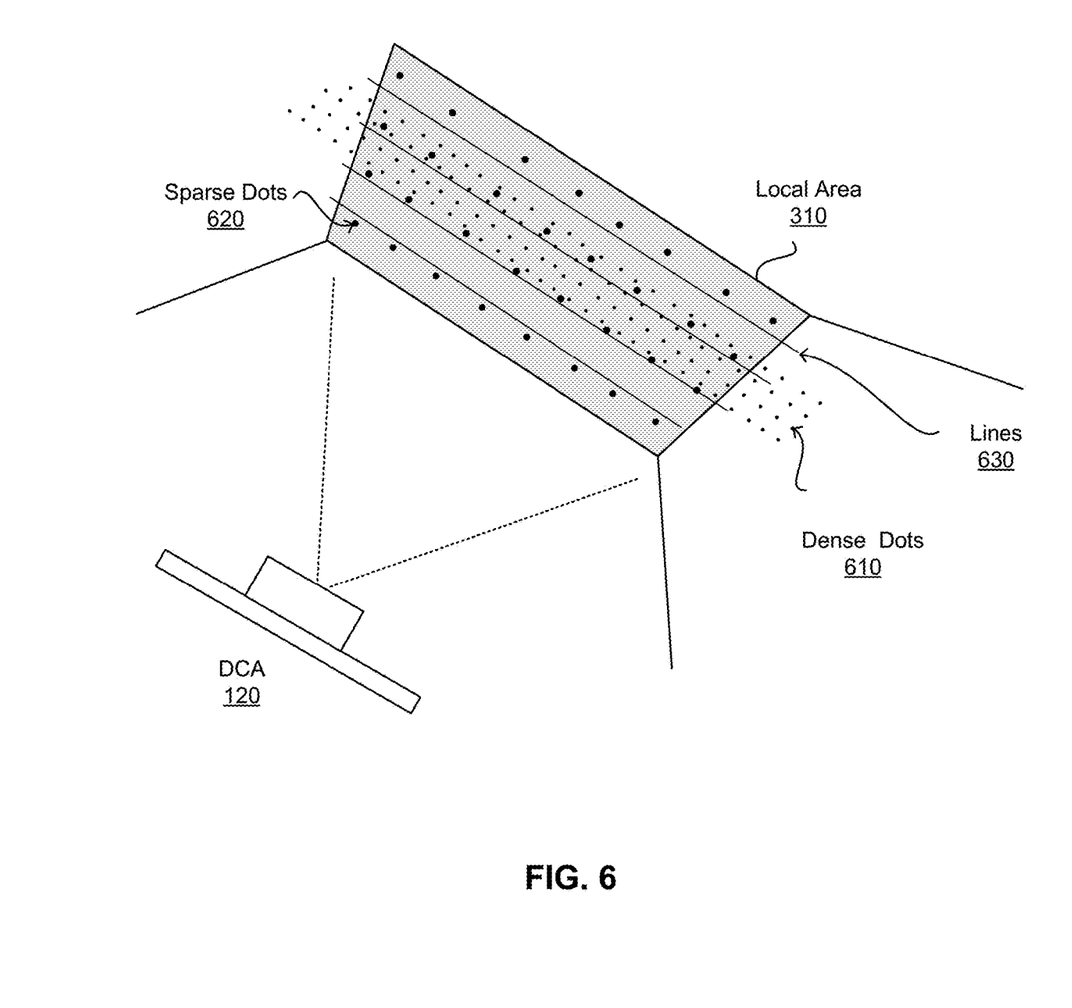
FIG. 6 shows an example arrangement of a depth camera assembly projecting different structured light patterns onto a local area, in accordance with an embodiment.

FIG. 6 shows an example arrangement of a depth camera assembly 120 projecting different structured light patterns onto a local area, in accordance with an embodiment. In this embodiment, the DCA 120 may use one emitter of the emitter array 342 to produce a SL pattern of dense dots 610 in a centrally located, wide angle view (large width), but narrow stripe (small height) area portion of the local area 310, which may be useful for covering objects closer to the DCA 120. The SL pattern of dense dots 610 may be lower in irradiance than a SL pattern of sparse dots 620. That is, for a given emitter, the amount of useful signal for an SL pattern of dots is proportional to the irradiance of the emitter divided by the number of dots (or if dots are not used, more generally the number and/or size of features of the pattern). For a SL pattern of dense dots 610, the irradiance of the emitter is divided by a large number of dots and each dot in the SL pattern of dense dots will have a lower irradiance than each dot of a SL pattern of sparse dots 620, since the irradiance of the emitter divided by a fewer number of dots gives a larger maximum irradiance per dot of the SL pattern of sparse dots 620. If the individual emitters of the emitter laser array 342 are roughly the same irradiance, then the SL pattern of densely spaced dots 610 is lower in irradiance than a pattern of sparsely spaced dots 620. Thus, an object closer to the DCA 120 can take better advantage of the SL pattern of dense dots 610 to have more detail (e.g., more collected data from more dots) and having the lower irradiance signal be reflected for an object closer to the DCA 120 to have a higher reflected signal than that of an object farther from the DCA 120. The DCA 120 may use one emitter of the multiple emitters to produce a SL pattern of sparse dots 620 over the entire local area 310, which may be useful for covering a whole scene at a large distance. An SL pattern of sparse dots 620 allow for a higher irradiance per dot, which has advantages when the light has to travel longer distances. The DCA 120 may use one emitter of the multiple emitters to produce a SL pattern of lines 630, as shown to be covering the entire local area 310. The SL pattern of lines 630 may have an even lower irradiance than the SL pattern of dense dots 610 or the SL pattern of sparse dots 620, and may be used in a situation where there is an near object of high reflectivity. The multiple emitters may be activated simultaneously, as shown in FIG. 6. Alternatively, the multiple emitters may be activated at different times. Each produced SL pattern may have different distributions (e.g., whole scene, close objects, far objects, etc.).

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
   an illumination source comprising:
      a plurality of emitters on a single substrate, each emitter configured to emit light, and
      a diffractive optical element (DOE) assembly including a plurality of diffractive optical elements (DOEs) that each have a different corresponding emitter, wherein each DOE is configured to generate a structured light pattern from light emitted from its respective corresponding emitter, of the plurality of emitters, wherein the DOE assembly projects the structured light patterns onto portions of a local area based in part on DOE projection geometries associated with the DOEs; and
   an imaging device configured to capture one or more images of the local area illuminated with at least some of the structured light patterns; and
   a controller configured to:
      instruct at least one of the plurality of emitters to emit light based in part on depth information associated with one or more objects in the local area.

2. The DCA of claim 1, wherein the structured light patterns include at least two different pattern types.

3. The DCA of claim 1, wherein the DOE projection geometries are such that at least one structured light pattern covers an area that is not covered by another structured light pattern.

4. The DCA of claim 1, wherein the DOE projection geometries are such that at least one structured light pattern covers a portion of the local area that is larger than a portion of the local area covered by another structured light pattern.

5. The DCA of claim 4, wherein the at least one structured light pattern is projected onto a smaller portion of the local area than the other structured light pattern, and the at least one structured light pattern has a lower irradiance value than the other structured light pattern.

6. The DCA of claim 1, wherein the illumination source further comprises an additional DOE, and the light from each of the emitters passes through the additional DOE before reaching the DOE assembly.

7. The DCA of claim 1, wherein the plurality of emitters emit light having characteristics selected from a group consisting of: polarization, range of wavelengths, amplitude, temporal modulation, intensity, some other feature that describes emitted light, and some combination thereof.

8. The DCA of claim 7, wherein the plurality of emitters include at least one emitter that emits light having different characteristics than another emitter of the plurality of emitters.

9. The DCA of claim 8, wherein the at least one emitter emits light in a different range of wavelengths than the other emitter of the plurality of emitters.

10. The DCA of claim 1, wherein the controller is further configured to determine the depth information for objects in the local area using the one or more images.

11. The DCA of claim 1, wherein the DCA is part of a head mounted display (HMD) comprising:
an electronic display element configured to display a virtual object based in part on the depth information; and
an optics block configured to direct light from the electronic display element to an exit pupil of the HMD.

12. A depth camera assembly (DCA) comprising:
an illumination source comprising:
a plurality of emitters on a single substrate, each emitter configured to emit light, and
a diffractive optical element (DOE) assembly including a plurality of diffractive optical elements (DOEs) that each have a different corresponding emitter, wherein each DOE is configured to generate a structured light pattern from light emitted from its respective corresponding emitter, of the plurality of emitters, wherein the DOE assembly projects the structured light patterns onto portions of a local area based in part on DOE projection geometries associated with the DOEs; and
an imaging device configured to capture one or more images of the local area illuminated with at least some of the structured light patterns; and
a controller configured to determine depth information for objects in the local area using the one or more images.

13. The DCA of claim 12, wherein the structured light patterns include at least two different pattern types.

14. The DCA of claim 12, wherein the DOE projection geometries are such that at least one structured light pattern covers an area that is not covered by another structured light pattern.

15. The DCA of claim 12, wherein the DOE projection geometries are such that at least one structured light pattern covers a portion of the local area that is larger than a portion of the local area covered by another structured light pattern.

16. The DCA of claim 15, wherein the at least one structured light pattern is projected onto a smaller portion of the local area than the other structured light pattern, and the at least one structured light pattern has a lower irradiance value than the other structured light pattern.

17. The DCA of claim 12, wherein the illumination source further comprises an additional DOE, and the light from each of the emitters passes through the additional DOE before reaching the DOE assembly.

18. The DCA of claim 17, wherein the DOE assembly further comprises one or more optical windows, wherein each optical window is configured to allow light emitted from a corresponding emitter of the plurality of emitters to pass through the DOE assembly.

19. The DCA of claim 12, wherein the plurality of emitters emit light having characteristics selected from a group consisting of: polarization, range of wavelengths, amplitude, temporal modulation, intensity, some other feature that describes emitted light, and some combination thereof and the plurality of emitters include at least one emitter that emits light having different characteristics than another emitter of the plurality of emitters.

20. The DCA of claim 12, wherein the controller is configured to instruct at least one of the plurality of emitters to emit light based in part on depth information associated with one or more objects in the local area.

21. A depth camera assembly (DCA) comprising:
an illumination source comprising:
a plurality of emitters on a single substrate, each emitter configured to emit light, and
a diffractive optical element (DOE) assembly including a plurality of diffractive optical elements (DOEs) that each have a different corresponding emitter, wherein each DOE is configured to generate a structured light pattern from light emitted from its respective corresponding emitter, of the plurality of emitters, wherein the DOE assembly projects the structured light patterns onto portions of a local area based in part on DOE projection geometries associated with the DOEs; and
an imaging device configured to capture one or more images of the local area illuminated with at least some of the structured light patterns; and
a controller configured to provide the one or more images to a console, wherein the console is configured to determine depth information based in part on the one or more images and generate a virtual object based in part on the depth information.

* * * * *

UNITED STATES PATENT AND TRADEMARK OFFICE
CERTIFICATE OF CORRECTION

PATENT NO. : 10,469,722 B2  
APPLICATION NO. : 15/249938  
DATED : November 5, 2019  
INVENTOR(S) : Nicholas Daniel Trail Page 1 of 1

It is certified that error appears in the above-identified patent and that said Letters Patent is hereby corrected as shown below:

In the Claims

Column 15, Line 47, Claim 12, delete "each have" and insert -- each has --.
Column 16, Line 42, Claim 21, delete "each have" and insert -- each has --.

Signed and Sealed this
Twenty-second Day of September, 2020

Andrei Iancu
*Director of the United States Patent and Trademark Office*